US005712676A

United States Patent [19]

Takaki et al.

[11] Patent Number: 5,712,676

[45] Date of Patent: Jan. 27, 1998

[54] IMAGE SCANNING AND PRINTING SYSTEM HAVING A COMMON PAPER FEEDING PASSAGE

[75] Inventors: Kosuke Takaki; Takao Araki, both of Dazaifu, Japan

[73] Assignee: Matsushita Electric Industrial Co., Ltd., Osaka, Japan

[21] Appl. No.: 224,878

[22] Filed: Apr. 8, 1994

[30] Foreign Application Priority Data

Apr. 14, 1993 [JP] Japan .................................... 5-087034

[51] Int. Cl.[6] ............................ B41J 2/435; G01D 15/24; H01S 1/131; G11B 7/00

[52] U.S. Cl. .......................... 347/262; 347/139; 347/264; 347/164; 347/153

[58] Field of Search ..................................... 358/298, 300, 358/296, 302; 347/262, 264, 169, 139, 153

[56] References Cited

U.S. PATENT DOCUMENTS 5,095,370 3/1992 Takada et al. .......................... 358/300

5,124,800 6/1992 Hashimoto .............................. 358/296

*Primary Examiner*—Benjamin R. Fuller

*Assistant Examiner*—Raquel Yvette Gordon

[57] ABSTRACT

A scanner printer includes a scanner portion for reading written information on an original manuscript paper and a printer portion for printing written information on printing paper, both of which are integrally combined within a single casing. The respective paper feeding into the scanner portion and the printer portion is performed through a common feeding passage. Thus, the overall dimension of the scanner printer can be downsized. A pointer directs the original manuscript and the printing paper into an original manuscript passage and into the printer portion, respectively. Hence, wear an on a surface of a photo-sensitive drum of the printer portion can be greatly reduced thus maintaining accurate and sharp printing characteristics.

4 Claims, 4 Drawing Sheets

IMAGE SCANNING AND PRINTING SYSTEM HAVING A COMMON PAPER FEEDING PASSAGE

BACKGROUND OF THE INVENTION

1. Field of the Invention

The present invention relates to a scanner printer integrating a scanner for reading information written on paper and a printer for printing information on paper.

2. Description of the Related Art

Conventionally, a scanner and a printer are separate devices, and they constitute a reading device and a printing device, respectively. The scanner as a reading device employs various scanning types, for example, drum scanning, CCD scanning, laser scanning and image reading by a TV camera. In the CCD scanning, reading light is projected onto an object and signal light reflected from the object forms an image on a CCD (Charge Coupled Device) camera device through an optical system, which is electronically scanned and then inputted as an electrical signal.

Many types of printers, such as thermo-sensitive type, discharge recording type, ink jet type, electrostatic recording type, electrophotographic type or the like, are available as a printing device. In the electrophotographic printer, a charge is applied in advance to a surface of a photosensitive drum made of OPC (Organic Photo Conductor) and a pattern, e.g. made of characters, is projected as a light image onto the surface of the drum so as to form an electrostatic latent image thereon. Then, the surface of the photosensitive drum, on which the electrostatic latent image is formed, is developed with a toner and pressed against a printing paper so that the toner on the pattern such as characters is transferred and fixed onto the paper, thereby completing the printing of the pattern.

Conventionally, since a scanner and a printer are separately installed, a problem is raised that a large space for installing them is required and the respective devices themselves are enlarged.

In order to make the respective devices compact, the scanner and the printer are integrated into a single device (a scanner printer) and a paper feeding passage is commonly used for the scanner and the printer. The number of sheets of printing paper fed to and discharged from the printer is approximately from 4 to 10 per minute, while the number of original manuscripts fed to and discharged from the scanner is approximately 40 or more per minute. Therefore, such a scanner printer presents the following new problem. Namely, since a large volume of original manuscripts is fed in the common feeding passage and the printer at a high speed, the surface of the photosensitive drum in the printer becomes worn, thus deteriorating the photoconductive characteristics and further failing to provide accurate and sharp printing.

OBJECT AND SUMMARY OF THE INVENTION

Accordingly, an object of the present invention is to provide a scanner printer which can overcome the aforementioned problems. More specifically, an object of the present invention is to provide a scanner printer of compact size which can maintain printing performance of the printer for a long term.

DETAILED DESCRIPTION OF PREFERRED EMBODIMENTS

Figure 1:
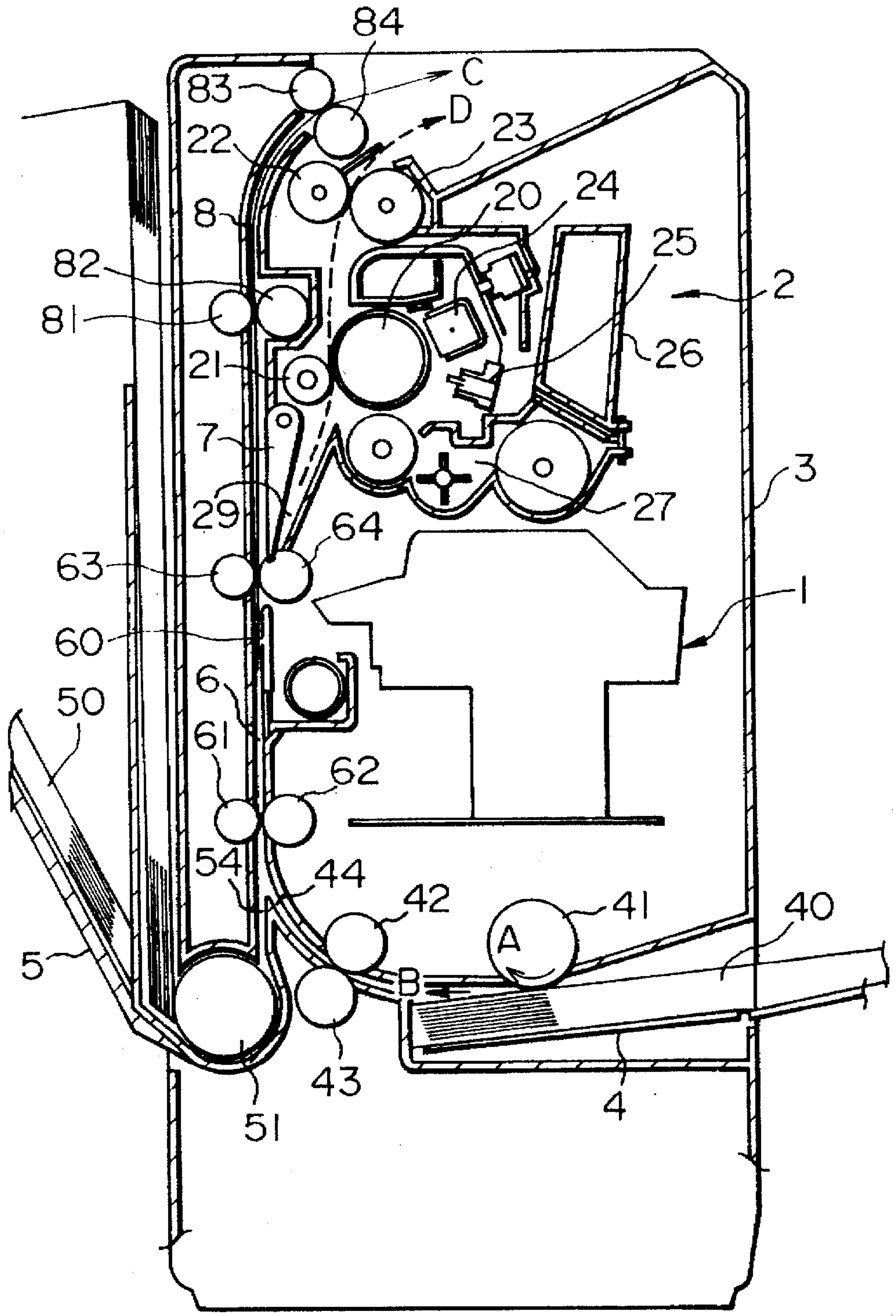
FIG. 1 is a schematic sectional view of a scanner printer according to one embodiment of the present invention.

Referring to FIG. 1, a scanner printer according to one embodiment comprises a scanner portion 1 for optically reading written information such as characters, images, or the like, written on an original manuscript, and a printer portion 2 disposed above the scanner portion 1 for printing written information on a printing sheet. They are accommodated within a casing 3. An original-document tray 4 is disposed in a bottom part of the casing 3 for feeding original manuscripts 40 by the rotation of a manuscript-feeding roller 41. A printing paper tray 5 is disposed on one side of the casing 3 for feeding plain printing copier (PPC) paper 50 by the rotation of a paper-feeding/separating roller 51.

Downstream in the paper-feeding direction of feed openings 44 and 54 of the original-document tray 4 and the printing paper tray 5, a common feeding passage 6 for feeding the original manuscripts 40 and the plain paper 50 is provided on one side of the scanner portion 1 to extend vertically. A pointer 7 is disposed in an opening at a downstream side in the paper-feeding direction in the common feeding passage 6 in order to switch between the feeding directions of the original manuscripts 40 and the plain paper 50. A passage 8 for feeding the original manuscripts 40 is arranged on one side of the printer 2 to extend through the pointer 7 vertically aligning with the common feeding passage 6. The pointer 7 is constructed to switch the feeding directions of the paper, i.e. to discharge the original manuscripts 40 from the common feeding passage 6 charge towards the original-manuscript feeding passage 8 and to discharge the plain paper 50 from the common feeding passage 6 towards a paper-feeding opening 29 of the printer 2.

An operation of this scanner printer is described hereinafter.

In a reading operation of the scanner portion 1, the original manuscripts 40 accommodated within the original-document tray 4 are drawn out by a rotation of the roller 41 indicated by an arrow A in a direction indicated by an arrow B. They are further separated one by one by a separation roller 42 and a retard roller 43 so as to be fed into the common feeding passage 6. Each of the original-manuscripts 40 is fed into a reading position 60 by a pressing roller 61 and a feeding roller 62 so that the scanner portion 1 can optically read the written information such as characters, drawings, or the like on the original manuscript 40 and output it as electrical signals.

After the written information is read, the original manuscripts 40 are fed upwards by a pressing roller 63 and a feeding roller 64 to pass through the common feeding passage 6. At this time, the pointer 7 is so switched over that the manuscript 40 from the common feeding passage 6 is directed to the original-manuscript feeding passage 8. The original-document manuscript 40 is fed upwards in the passage 8 by a pressing roller 81 and a manuscript-feeding roller 82 and then discharged outside of the scanner printer by means of discharge rollers 83 and 84. Accordingly, the original-manuscripts 40 are fed along a passage indicated by a solid line C in FIG. 1, and then a plurality of original manuscripts 40 accommodated within the original-document tray 4 are sequentially read out and discharged.

As apparent from the foregoing description, during the reading operation of the scanner portion 1, since the original-document manuscripts 40 do not pass through the printer portion 2, wear on a photosensitive drum 20 or the like is avoided even though the respective rollers of the feeding system are driven at high speeds, thereby enabling high-speed reading.

On the contrary, in a printing operation of the printer 2, plain paper sheets 50 accommodated within the tray 5 are separated one by one by a feeding/separating roller 51 and fed into the common feeding passage 6. The plain paper 50 in the common feeding passage 6 is further fed upwards by the pressing roller 61 and the feeding roller 62 and then discharged from the common feeding passage 6 by the pressing roller 63 and the feeding roller 64.

In the printing operation of the printer portion 2, the pointer 7 has been switched over in advance so that the plain paper 50 from the common feeding passage 6 is directed towards the printer portion 2 through the opening 29.

The plain paper 50 passes between the photosensitive drum 20 and a pressing roller 21 in the printing portion 2, so that a toner pattern formed on the photosensitive drum 20 is transferred onto the paper 50. After the toner pattern is transferred onto the plain paper 50, it is fixed thereon by the heating and pressure-fixing of a pressing roller 22 and a fixing roller 23, thereby completing printing. The paper 50 is discharged outside of the scanner printer device by these rollers 22 and 23. Accordingly, the plain paper 50 prints and is discharged along the pass indicated by a broken line D in FIG. 1.

The printing operation is performed in the printer portion 2 as follows. Namely, a corona discharge electrode 24 applies a charge to the entire surface of the photosensitive drum 20 and an LED (Light Emitting Diode) 25 also applies light to the photosensitive drum 20 to form an electrostatic latent image thereon. Further, a developer unit 27 draws a toner fed from a toner cartridge 26 to the photosensitive drum 20 on which the electrostatic latent image is formed, thereby completing developing. The photosensitive drum 20 is then rotated so as to transfer the toner pattern onto the plain paper 50, thereby completing the printing operation. After printing on a sheet of plain paper 50 is completed, a cleaner 28 removes the toner remaining on the surface of the photosensitive drum 20 therefrom. A description will now be given of the construction and the switching operation of the pointer 7 in detail with reference to FIGS. 2–4. The pointer 7 includes a turning shaft 70 and a switching plate 71 fixed to the shaft 70, so that the switching plate is swung in accordance with the turn of the shaft 70. A friction clutch 72 is provided at one end portion of the shaft 70. An endless belt 73 is engaged with the friction clutch 72 so as to swing the switching plate 71.

Figure 4:
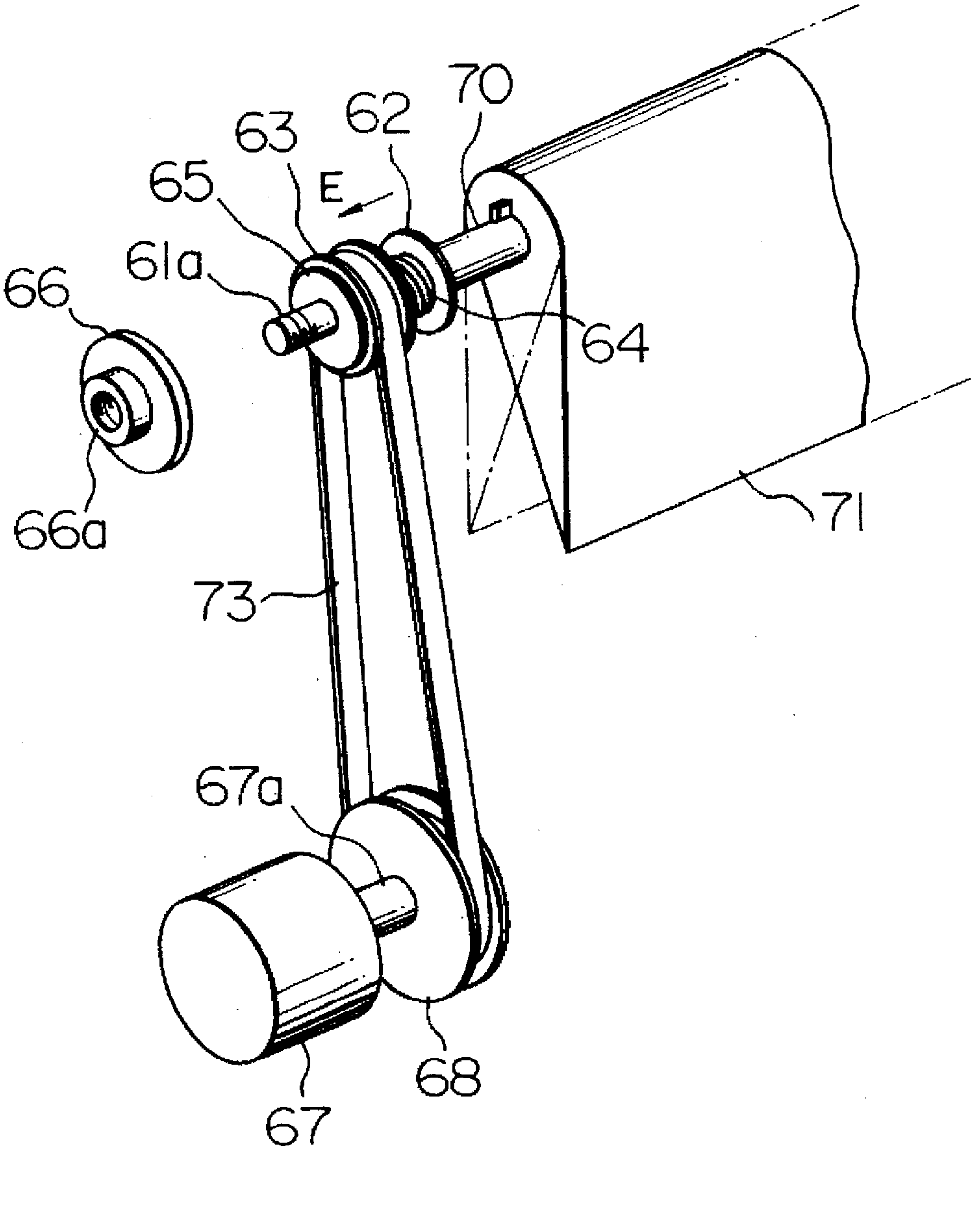
FIG. 4 is a perspective view of the pointer shown in FIG. 2.

More specifically, referring to FIG. 4, the belt 73 is engaged between a pulley 68 secured to an output shaft 67*a* of an electric motor 67 and a pulley 63. The rotation torque of the motor 67 rotates the pulley 63 through the belt 73. The pulley 63 is loosely engaged with the shaft 70 and then it can move freely along the shaft 70 and rotate freely therearound. A snap ring 62 is secured to the shaft 70 in the vicinity of the pulley 63. A spring 64 is disposed between the snap ring 62 and one end of the pulley 63 so as to urge the pulley 63 in the direction indicated by the arrow E. A friction ring 65 is disposed on the other end of the pulley 63. A disk 66 is secured to the end of the shaft 70. The turn of the disk 66 causes the turn of the shaft 70.

An operation of the pointer 7 will be described hereinafter. When the electric motor 67 rotates in a normal direction, the belt 73 is rotated in a direction indicated by a solid line in FIG. 2, and then the pulley 63 also rotates. The pulley 63 is pressed against the disk 66 through the friction ring 65 by the spring 64. The disk 66 is also rotated by a friction force generated between the friction ring 65 and the disk 66, and then the shaft 70 turns in the direction indicated by a solid line in FIG. 3 to swing the switching plate 71. As a result, the original manuscripts 40 from the common feeding passage 6 are not fed into the paper-feeding opening 29 of the printer portion 2 but to the original-manuscript feeding passage 8.

Figure 2:
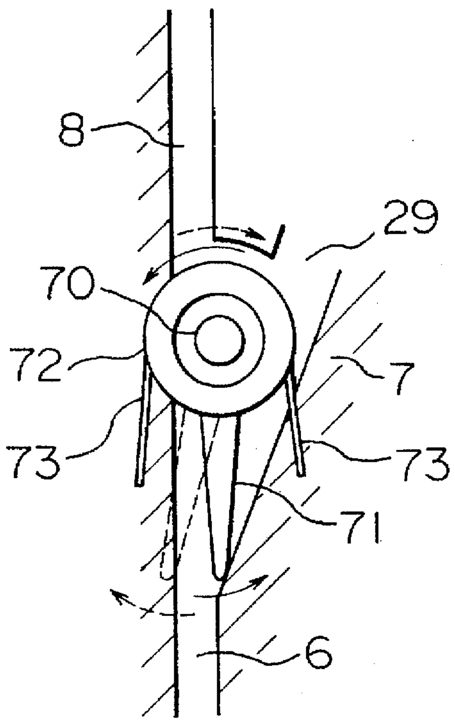
FIG. 2 is a side view of a pointer of the scanner printer shown in FIG. 1.
Figure 3:
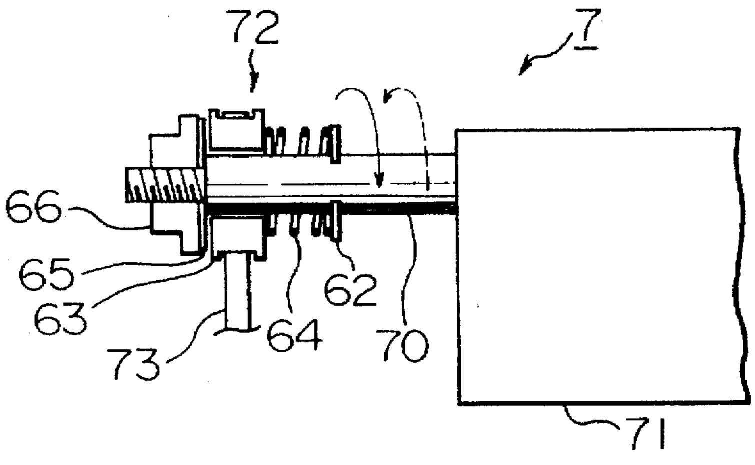
FIG. 3 is a front view of the pointer shown in FIG. 2.

On the other hand, when the electric motor 67 rotates reversely, the belt 73 is rotated in a direction indicated by a broken line in FIG. 2, and then the pulley 63 also rotates. Therefore, the disk 66 is also rotated by a friction force generated between the friction ring 65 and the disk 66, and then the shaft 70 turns in the direction indicated by a broken line in FIG. 3 to swing the switching plate 71 reversely. As a result, the plain paper 50 from the common feeding passage 6 is fed into the paper-feeding opening 29 of the printer portion 2.

Figure 5:
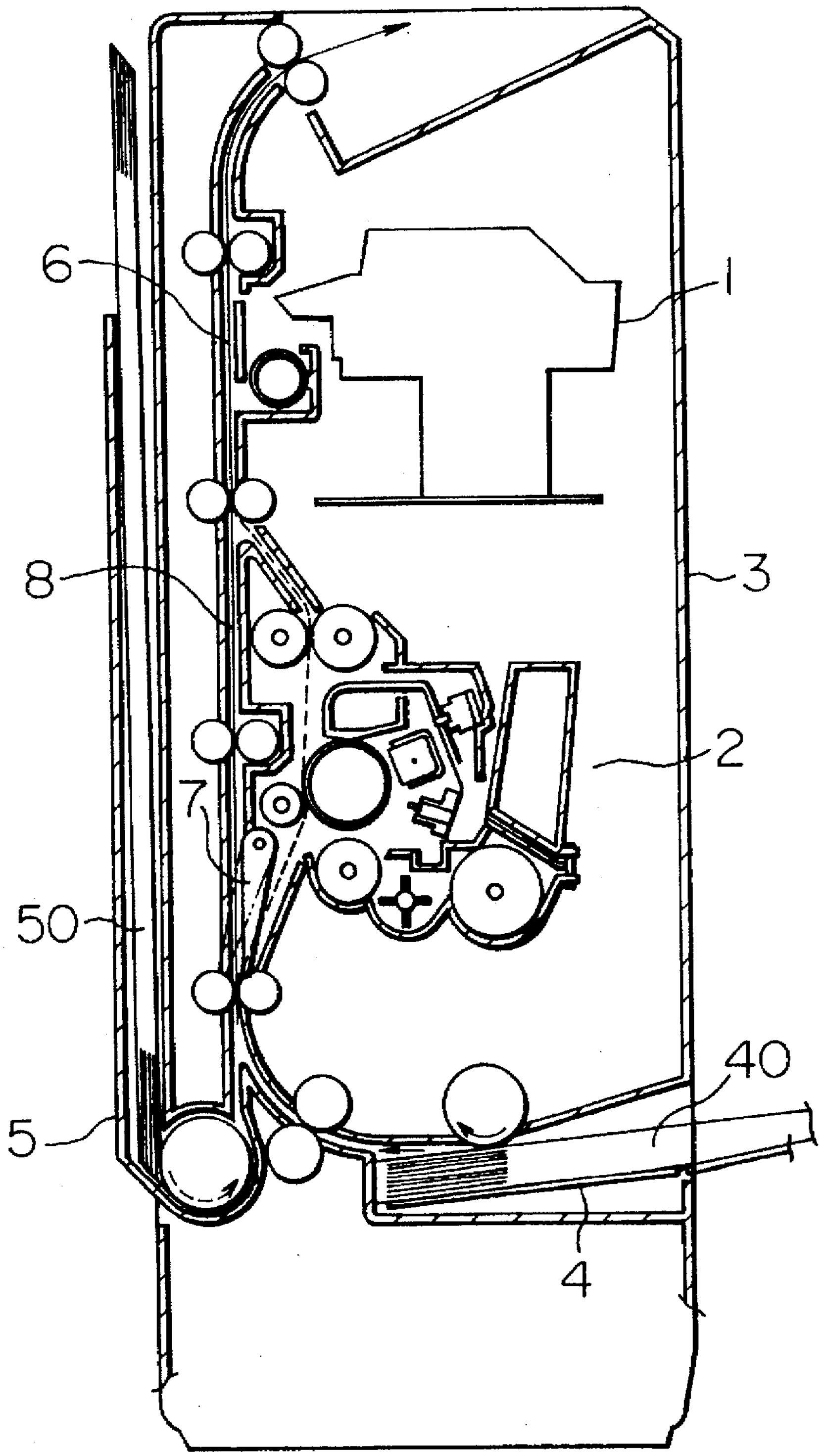
FIG. 5 is a schematic sectional view of a scanner printer according to another embodiment of the present invention.

FIG. 5 shows a scanner printer according to another embodiment of the present invention. The scanner printer of this embodiment comprises a scanner portion 1, a printer portion 2, a common feeding passage 6, a pointer 7 and an original-document manuscript feeding passage 8, similar to the scanner printer shown in FIG. 1. These components are accommodated within a casing 3, but the arrangement thereof differs from that in the scanner printer shown in FIG. 1.

Within the casing 3, the printer portion 2 is disposed below the scanner portion 1, and the pointer 7 is disposed below and adjacent to the side of the printer portion 2. The original-manuscript feeding passage 8 extending above the pointer 7 is arranged adjacent to the side of the printer portion 2. Further, the common feeding passage 6 is disposed adjacent to the side of the scanner portion 1 so as to be communicated at one end thereof with a joint portion between the end opening of the original-manuscript feeding passage 8 and the discharge opening of the printer portion 2.

According to the scanner printer of this embodiment, since the printer portion 2 is placed below the scanner portion 1, the scanner portion 1 is free from the adverse influence of a toner which might fall and scatter from the printer portion 2, thus effectively avoiding obstacles in the way of the reading operation of the scanner portion 1. According to the operation of the pointer 7 which is constituted by the same structure as that shown in FIG. 1, during the reading operation by the scanner portion 1, the original manuscripts 40 are fed as indicated by the solid line arrow shown in FIG. 5, whereas during the printing operation by the printer portion 2, the plain paper 50 is fed as indicated by the broken line arrow.

The arrangement of the essential components of the scanner printer is not limited to those in the above embodiments, but may be varied by combining the components as desired. For example, the original document tray 4 or the plain paper 50, or both may be disposed at an upper part and the paper may be fed downwards.

Also, the scanner portion 1 may perform the scanning operation according to various processes, such as drum scanning, CCD scanning, laser scanning, or image reading by a TV camera. Further, although the printer portion 2 performs electrophotographic printing in the above embodiments, it may be operable according to other processes such as discharge printing, ink jet printing, electrostatic printing, or the like.

As will be clearly understood from the foregoing description, the present invention offers the following advantages.

The scanner portion and the printer portion are integrally combined and the feeding passage is commonly used not only for feeding the original manuscripts to the scanner portion but also for feeding the plain paper to the printer portion, thereby making the overall apparatus smaller. Also, the directions of feeding the original manuscripts and the printing paper are switched over by the switching means so as to be fed into the manuscript-feeding passage and the printer portion, respectively, thereby greatly reducing the wear of the surface of the photosensitive member in the printer portion, thus maintaining accurate and sharp printing characteristics.

What is claimed is:

1. An image reading and printing system for reading image information on an image information surface of manuscript paper and for printing information onto a surface of printing paper, said system comprising:

(a) a casing including:

a manuscript paper feeding passage for passing said manuscript paper therethrough with said manuscript paper being oriented such that said image information surface is directed upward;

a printing paper feeding passage for passing said printing paper therethrough;

a common paper feeding passage including a single feeding passage commonly used for feeding therethrough the manuscript paper after passing from said manuscript paper feeding passage and the printing paper after passing from said printing paper feeding passage;

a first discharge passage, disposed to receive the manuscript paper from said common paper feeding passage, for discharging the manuscript paper out of said casing; and a second discharge passage, disposed to receive the printing paper from said common paper feeding passage, for discharging the printing paper out of said casing;

(b) image information reading means for reading the image information on the manuscript paper while the manuscript paper is in said single feeding passage, said image information reading means facing said image information surface of said manuscript paper;

(c) printing means for printing information onto the printing paper while said printing paper is in said second discharge passage; and (d) means for controlling switch-over of paper feeding from said common paper feeding passage between (i) said first discharge passage and (ii) said second discharge passage.

2. An image reading and printing system for reading image information on an image information surface of manuscript paper and for printing information onto a surface of printing paper, said system comprising:

(a) a casing including:

a manuscript paper feeding passage for passing said manuscript paper therethrough with said manuscript paper being oriented such that said image information surface is directed upward;

a printing paper feeding passage for passing said printing paper therethrough; and a common paper feeding passage including a single feeding passage commonly used for feeding therethrough the manuscript paper after passing from said manuscript paper feeding passage and the printing paper after passing from said printing paper feeding passage;

(b) image information reading means for reading the image information on the manuscript paper while the manuscript paper is in said single feeding passage, said image information reading means facing said image information surface of said manuscript paper; and (c) printing means for printing information onto the printing paper while said printing paper is in said printing paper feeding passage.

3. An image reading and printing system as in claim 1, wherein said manuscript paper and said printing paper pass through said common paper feeding passage at different times.

4. An image reading and printing system as in claim 2, wherein said manuscript paper and said printing paper pass through said common paper feeding passage at different times.

* * * * *